United States Patent Office 2,715,133
Patented Aug. 9, 1955

2,715,133

ORGANOSILYLAMINES

John L. Speier, Pittsburgh, Pa., assignor to Dow Corning Corporation, Midland, Mich., a corporation of Michigan No Drawing. Application June 30, 1950,
Serial No. 171,553

6 Claims. (Cl. 260—448.2)

This invention relates to organosilylmethylamines.

Organosilicon amines heretofore known, consist mainly of those in which nitrogen is linked directly to a silicon atom. These materials are commonly called silazanes and are characterized by the fact that the silicon nitrogen bond is cleaved by water. The present invention deals with organosilicon amines in which the nitrogen is linked to a carbon. These materials are not cleaved by water.

It is the object of this invention to prepare new silicon amines which are stable in the presence of water. Another object is to prepare materials which are useable as intermediates in the formation of organosilicon resins, as catalysts in the polymerization of organosiloxanes, and as emulsifying agents.

This invention relates to compounds of the formula $(R_3SiCH_2)_aNR'_bH_{3-a-b}$ in which $a$ has a value from 1 to 2, $b$ has a value from 0 to 2, the sum of $a+b$ being not greater than 3, R is of the group alkyl, monocyclicaryl hydrocarbon and alkoxy radicals, R' is of the group alkyl cycloparaffin, monocyclic aryl hydrocarbon radicals and hydroxy alkyl radicals where the OH group is at least beta to the nitrogen.

The above compounds are preferably prepared by reacting a halogenomethylsilane with ammonia or an amine. Reaction is represented by the equation

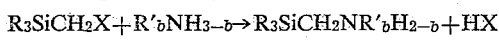

$$R_3SiCH_2X + R'_bNH_{3-b} \rightarrow R_3SiCH_2NR'_bH_{2-b} + HX$$

The above reaction is generally carried out by heating the silane and the amine under anhydrous conditions at temperatures of from 50° C. to 200° C. With ammonia and low boiling amines it is desirable to carry out the reaction in an autoclave. In those cases where the silane contains a silicon bonded oxygen such as an alkoxy radical, it is essential that the reaction mixture be anhydrous.

If desired, the reaction may be carried out in a solvent such as toluene or anhydrous alcohols. However, no particular advantage is gained by employing solvents.

The halomethylsilanes employed in this invention are of the formula $R_3SiCH_2X$ in which X is chlorine or bromine and R is any alkyl or monocyclic aryl hydrocarbon radical or any alkoxy radical, or combinations of these radicals. Specific examples of such silanes which are operative in this invention are trimethylchloromethylsilane, phenyldimethylbromomethylsilane, tripropylchloromethylsilane, triphenylchloromethylsilane, diethoxymethylbromomethylsilane, phenylisopropoxymethylchloromethylsilane, octadecoxychloromethyldimethylsilane, and triethoxychloromethylsilane.

The amino compounds which are reacted with the above silanes are, for example, ammonia, methylamine, aniline, cyclohexylamine, isopropylamine, dimethylamine, tolylamine, ethanolamine, and gamma-propanolamine. With hydroxyalkyl amines it is necessary to block the OH group before reaction with the chloromethylsilane. Any primary amine in which the organic radicals are alkyl, cycloparaffin, monocyclic aryl hydrocarbon, or hydroxyalkyl in which the hydroxy group is at least beta to the nitrogen, can be reacted with the above defined triorganohalomethylsilanes and are included within the scope of this invention.

The organosilicon amines of this invention form salts when reacted with acids and alkyl halides. In addition, quaternary salts may be prepared by reacting the silanes with tertiary amines. The salts are represented by the general formula $[(R_3SiCH_2)_aNR'_bH_{4-a-b}]Y$ where $a$ has a value of from 1 to 2, $b$ has a value of from 0 to 3 the sum of $a+b$ being not greater than 4, and Y is an acid anion.

The products of this invention are useful as catalysts in the setting of organosiloxane resins, as emulsifying agents, and as intermediates in the production of organosilicon resins.

The following examples are illustrative only and should not be considered as limiting the scope of the invention.

*Example 1.*—367 grams of trimethylchloromethylsilane and 900 grams of anhydrous ammonia were heated at a temperature of 89° C. at a pressure of 640 p. s. i. for 1½ hours. After cooling, the excess ammonia was released and the residue was dissolved in water and added to 4 mols of concentrated sodium hydroxide solution. The solution was steam distilled to dryness into a dilute hydrochloric acid solution to get rid of iron salts present in the reaction mixture. The amine salts were dissolved in an excess of concentrated NaOH and the organic layer was separated. The aqueous layer was extracted twice with ether and the extract combined with the original organic layer. The product was distilled from powdered KOH and there was obtained trimethylsilylmethylamine, boiling point 93° C. at 736 mm., $d$ at 25° C. of 0.766, $n$ at 25° C. of 1.4146, and specific refraction of 0.3265. Further distillation gave bis(trimethylsilylmethyl)amine, boiling point 168° C. at 739 mm., $n$ at 25° C. of 1.4216, $d$ at 25° C. of 0.1773, and a specific refraction 0.386.

The primary amine formed a hydrochloride melting 240° C. to 241° C., a sulfate decomposing at 213° C. to 216 C., and a p-nitro benzamide melting at 123.5 C. The secondary amine formed a hydrochloride melting at 158.5 C.

Trimethylsilylmethyl amine was reacted with adipic acid to give the crystalline salt

$$(CH_3)_3SiCH_2NH_2 \cdot HOOC(CH_2)_4COOH \cdot NH_2CH_2Si(CH_3)_3$$

*Example 2.*—The above run was repeated except that trimethylbromomethylsilane was employed. The reaction products were the same.

The trimethylbromomethylsilane was prepared by brominating tetramethylsilane with a mixture of chlorine and bromine in the presence of light.

*Example 3.*—162 grams of chloromethyldimethylethoxysilane was heated with 527 grams of anhydrous ammonia at 96° C. to 106° C. in an autoclave for 2½ hours. The excess ammonia was removed and the product filtered free of ammonium chloride. The reaction product was distilled, whereupon there was obtained dimethylethoxysilylmethylamine, boiling 132° C. at 740 mm., $n$ 25° C. of 1.4111, $d$ 25° C. of 0.849, and a specific refraction of .2924. The hydrochloride of the above compound was found to melt at 182° C. to 187° C.

Continued distillation of the product produced the compound bis(dimethylethoxysilylmethyl)amine

$$[(CH_3)_2(C_2H_5O)SiCH_2]_2NH$$

161° C. to 175° C. at 24 mm., $n$ at 25° C., 1.4333, $d$ 25° C., .0892, and a specific refraction of .2916.

*Example 4.*—122.6 grams of chloromethyltrimethylsilane was mixed with 250 grams of freshly distilled aniline and heated to 110° C. for 4 hours and finally at 107° C. for an additional 4 hours. 40 grams of sodium hydroxide and 60 cc. of water were added and the aqueous layer was separated. The organic layer was dried and distilled and there was obtained N-(trimethylsilylmethyl)phenylamine, boiling 135° C. at 24 mm., n at 25° C. of 1.5215, d at 25° C. of .917, and specific refraction of .3322. This material forms a hydrochloride salt which melts 119° C. to 120° C. The amine coupled readily with the diazonium salt made from p-nitroaniline to yield a red crystalline dye which, after recrystallization from methanol, melted 89° C. This material had the formula

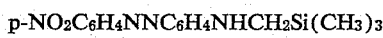

p-NO$_2$C$_6$H$_4$NNC$_6$H$_4$NHCH$_2$Si(CH$_3$)$_3$

*Example 5.* — Chloromethyldimethylphenylsilane was prepared by coupling chloromethyldimethylchlorosilane with phenylmagnesium bromide. 193 grams of the chloromethyldimethylphenylsilane was heated in a bomb with shaking with 425 grams of anhydrous ammonia. The temperature was raised to 103° C. during 2 hours and then permitted to fall to room temperature. The product was washed with a solution of 52 grams of sodium hydroxide and 300 cc. of water. The water-insoluble liquid was distilled. There was obtained dimethylphenysilylmethylamine, boiling 115° C. at 23 mm., n at 25° C., 1.5202, d at 25° C. of .941 and a specific refraction .3235.

Continued distillation gave the secondary amine bis-(dimethylphenylsilylmethyl)amine having a boiling point of 215° C. at 23 mm., n at 25° C. of 1.5332, d at 25° C. of .958, and a specific refraction of .3239. The hydrochloride of the above amines was formed, and that of the primary amine melted 198° C. and of the secondary amine at 121° C. to 126° C.

*Example 6.*—120.5 grams of chloromethyltrimethylsilane was heated under pressure with 53.5 grams of anhydrous dimethylamine for 2½ hours at 90° C. to 130° C. The products were dissolved in water and made acidic and extracted with ether to remove unreacted chloromethyltrimethylsilane. The aqueous solution was then made basic with about 2 mols sodium hydroxide and steam distilled. The steam distillate was redistilled. There was obtained trimethylsilylmethyldimethylamine having a boiling point of 110° C. at 746 mm., n at 25° C. of 1.4101, d at 25° C. of .746, and a specific refraction of .3321. The amine readily formed a hydrochloride melting 185° C. It reacted very well with methyliodide to produce the quaternary salt [(CH$_3$)$_3$SiCH$_2$N(CH$_3$)$_3$]+I− in quantitative yield. The melting point of this salt was 241.5° C.

*Example 7.*—176 grams of cyclohexyl amine were heated to about 100° C. and 122 grams of chloromethyldimethylethoxysilane was added slowly while stirring. When the addition was complete the mixture was refluxed two hours, cooled and filtered free of cyclohexylamine hydrochloride. The filtrate and the washings were combined and distilled to yield dimethylethoxysilylmethylcyclohexylamine having a boiling point of 162° C. at 100 mm., n at 25° C. of 1.4488, d at 25° C. of .889, and a specific refraction of .3014.

Continued distillation produced bis(dimethylethoxysilylmethyl)cyclohexylamine.

*Example 8.*—Trimethylchloromethylsilane was reacted with cyclohexylamine as in Example 7 and upon distillation of the reaction product N-(trimethylsilylmethyl)-cyclohexylamine was obtained having a boiling point of 113° C. to 117° C. at 50 mm., n at 25° C. of 1.4522, d at 25° C. of .838. This material formed a hydrochloride having a melting point 235° C. to 239° C.

*Example 9.*—376 grams of octadecylamine were heated with 87 grams of chloromethyltrimethylsilane at 110° C. to 140° C. for one hour with stirring. The mixture was then cooled, washed with 30 per cent sodium hydroxide solution and distilled. N-(trimethylsilylmethyl)octadecylamine was obtained boiling at 188° C. to 198° C. at 1 mm. This material is a waxy crystalline solid, melting point 26° C. to 32° C. The super-cooled liquid had a refractive index at 25° C. of 1.4501, density at 25° C. of .813, and a specific refraction of .3306. The amine forms a sparingly water soluble hydrochloride melting point 101° C. to 102° C.

A high boiling residue containing bis(trimethylsilylmethyl)octadecylamine was also obtained.

*Example 10.*—130 grams of chloromethyltrimethylsilane and 214 grams of anhydrous methylamine were heated together for two hours at 130° C. to 132° C. The excess methylamine was removed and the product was added to 50 grams of sodium hydroxide and 200 cc. of water. The mixture was then distilled and after removal of an azeotrope of the product and water anhydrous N-(trimethylsilylmethyl)-methylamine was obtained, boiling 102° C. at 735 mm. This material had a refractive index at 25° C. of 1.4094, a density at 25° C. of .754, and specific refraction of .3283. The amine forms a hydrochloride salt, melting point 199° C. to 200° C.

*Example 11.*—189 grams of chloromethyldiethoxymethylsilane was heated with 537 grams of anhydrous ammonia at 100° C. to 110° C. for three hours. The autoclave was cooled and the excess ammonia allowed to escape. The product was filtered free of ammonium chloride and the liquid product was distilled to give diethoxymethylsilylmethylamine, boiling point 68° C. at 24 mm. The amine had a refractive index at 25° C. of 1.4123, a density at 25° C. of .915, and specific refraction of .2720.

A higher boiling residue containing bis(diethoxymethylsilylmethyl)amine was also obtained.

*Example 12.*—122.5 grams of chloromethyltrimethylsilane and 180 grams of anhydrous isopropyl amine were heated under pressure at 100° C. to 150° C. for five hours. The reaction mixture was filtered free of isopropyl amine hydrochloride and the liquid filtrate was mixed with 150 cc. of water containing 42 grams of sodium hydroxide. The product was distilled to give N-(trimethylsilylmethyl)isopropylamine, boiling point 124° C. at 734 mm. Other physical properties were as follows: n, 25° C., 1.4116, d 25° C., .752, and specific refraction .3307. The amine readily forms a hydrochloride salt, melting point 136° C. to 137° C.

*Example 13.*—Dimethyldiethoxysilane was reacted with ethanol amine at a temperature above the boiling point of ethyl alcohol. Ethyl alcohol was removed during the reaction and there was obtained bis(b-aminoethoxy)dimethylsilane, boiling point 124° C. at 23 mm. and having a specific refraction of .2677.

110 grams of this ester was heated to 110° C. as 123.5 grams of chloromethyltrimethylsilane was added slowly with stirring. Heating with agitation was continued for five hours. An aqueous solution of 40.4 grams of NaOH was then added. The resulting products were dimethylsiloxane and N-(trimethylsilylmethyl)betahydroxyethylamine (CH$_3$)$_3$SiCH$_2$NHCH$_2$CH$_2$OH. The latter was recovered by a distillation and was found to have a boiling point of 101° C. at 24 mm., n 25° C. of 1.4461, d 25° C. .883 and a specific refraction of .3021. This amine forms a hydrochloride melting at 114° C. to 116° C.

*Example 14.*—Chloromethyltriethoxysilane was prepared by chlorinating methyltrichlorosilane in the presence of light to give chloromethyltrichlorosilane. This compound was reacted with ethanol to give chloromethyltriethoxysilane. The latter was distilled and was found to boil at 91° C. at 25 mm.

326 g. of the chloromethyltriethoxysilane was heated in an autoclave with 572 g. of liquid ammonia at a temperature from 100° C. to 122° C. for 6 hours. The reaction product was filtered free of ammonium chloride and distilled to give triethoxysilylmethylamine B. P. 93° C. at 26 mm., $n_D^{25°\,C.}$ 1.4080, $d_4^{25°\,C.}$ 0.955 and a specific refraction 0.2583.

Continued distillation gave bis(triethoxysilylmethyl)-amine B. P. 117.4° C. at 0.4 mm., $n_D^{25°\,C.}$ 1.4132, $d_4^{25°\,C.}$ 0.973 and a specific refraction 0.2563.

That which is claimed is:

1. A compound of the formula $$(R_3SiCH_2)_aNR'_bH_{3-a-b}$$

where $a$ has a value from 1 to 2, $b$ has a value from 0 to 2 the sum of $a+b$ being not greater than 3, R is selected from the group consisting of alkyl, monocyclicaryl hydrocarbon, and alkoxy radicals, and R' is selected from the group consisting of alkyl, cycloparaffin, monocyclicaryl hydrocarbon radical, and hydroxyalkyl radicals where the OH group is at least beta to the nitrogen.

2. $R_3SiCH_2NH_2$ where R is an alkyl radical.
3. $(R_3SiCH_2)_2NH$ where R is an alkyl radical.
4. $(R_3SiCH_2)_2NR'$ where R is an alkyl radical and R' is an alkyl radical.
5. $(R_3SiCH_2)NR'_2$ where R is an alkyl radical and R' is an alkyl radical.

6. A salt of the formula $[(R_3SiCH_2)_aNR'_bH_{4-a-b}]Y$ where $a$ has a value from 1 to 2, $b$ has a value from 0 to 3, the sum of $a+b$ being not greater than 4, Y is an acid anion, R is selected from the group consisting of alkyl, monocyclicaryl hydrocarbon and alkoxy radicals and R' is selected from the group consisting of alkyl, cycloparaffin, monocyclicaryl hydrocarbon radicals and hydroxyalkyl radicals where the OH group is at least beta to the nitrogen.

References Cited in the file of this patent
UNITED STATES PATENTS

| | | |
|---|---|---|
| 2,462,635 | Haber | Feb. 22, 1949 |
| 2,474,578 | Gilliam | June 28, 1949 |
| 2,557,802 | Sommer | June 19, 1951 |